(12) United States Patent
Norita et al.

(10) Patent No.: US 9,334,955 B2
(45) Date of Patent: May 10, 2016

(54) DRUM TYPE-VARIABLE SPEED DRIVE

(71) Applicant: HONDA MOTOR CO., LTD., Tokyo (JP)

(72) Inventors: Kazuhiro Norita, Wako (JP); Hiromi Sumi, Wako (JP); Toshimasa Mitsubori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 14/496,476

(22) Filed: Sep. 25, 2014

(65) Prior Publication Data
US 2015/0090062 A1    Apr. 2, 2015

(30) Foreign Application Priority Data
Sep. 30, 2013    (JP) .................................. 2013-204981

(51) Int. Cl.
*F16H 63/18*    (2006.01)
*F16H 63/30*    (2006.01)

(52) U.S. Cl.
CPC ........ *F16H 63/18* (2013.01); *F16H 2063/3089* (2013.01); *Y10T 74/20183* (2015.01)

(58) Field of Classification Search
CPC ............ F16H 63/18; F16H 2063/3089; F16H 2063/3076; F16H 2063/3079
USPC ....................................................... 74/337.5
See application file for complete search history.

(56) References Cited

U.S. PATENT DOCUMENTS

| 5,024,113 | A * | 6/1991 | Ito ......................... | B60K 17/04 123/179.1 |
|---|---|---|---|---|
| 2002/0062703 | A1* | 5/2002 | Arakawa ................. | F16H 3/089 74/337.5 |
| 2002/0139215 | A1* | 10/2002 | Smith ..................... | F16H 63/32 74/473.37 |
| 2006/0090584 | A1* | 5/2006 | Ho ......................... | F16H 63/18 74/473.36 |
| 2007/0261511 | A1* | 11/2007 | Ho ......................... | F16H 63/32 74/523 |
| 2009/0222182 | A1* | 9/2009 | Tomoda ................ | F16D 25/086 701/67 |
| 2010/0050805 | A1* | 3/2010 | Hayakawa .............. | F16H 63/18 74/473.28 |
| 2011/0155497 | A1* | 6/2011 | Kobayashi ............. | B60K 20/04 180/365 |
| 2014/0083228 | A1* | 3/2014 | Mitsubori ............... | F16H 63/18 74/473.36 |

FOREIGN PATENT DOCUMENTS

JP    2515989    4/1996

\* cited by examiner

*Primary Examiner* — William Kelleher
*Assistant Examiner* — Gregory Prather
(74) *Attorney, Agent, or Firm* — Rankin, Hill & Clark LLP

(57) ABSTRACT

A drum type-variable speed drive wherein a spring bearing member, which is restricted from moving in the axial direction of departing from a shift fork by a locking member fixed to a shift fork shaft, is pivotally supported by the shift fork shaft. A lost motion spring is interposed between the spring bearing member and the shift fork. Movement of the shift fork shaft in the axial direction caused by rotation of a shift drum presses the spring bearing member through the locking member, whereby the spring load of the lost motion spring acts on the shift fork.

12 Claims, 11 Drawing Sheets

DRUM TYPE-VARIABLE SPEED DRIVE

BACKGROUND OF THE INVENTION

1. Field of the Invention

The present invention relates to a drum type-variable speed drive in which a shift fork is moved by rotation of a shift drum to shift gears of a transmission.

2. Description of Related Art

A drum type-variable speed drive is generally employed to shift gears of a transmission (see Japanese Patent No. 2515989, for example).

A drum type-variable speed drive disclosed in Japanese Patent No. 2515989 has a general structure, where, with rotation of a shift drum, a shift fork pivotally supported by a shift fork shaft in a slidable manner moves in the axial direction while being guided by a fork guide groove, whereby a shifter member of a transmission engaged with the shift fork is moved in order to drive the gear shift.

While the shifter member of the transmission is spline-fitted to a transmission shaft and capable of moving in the axial direction, it is incapable of rotating relative to the transmission shaft, and thus rotates integrally therewith.

A transmission gear pivotally supported by the transmission shaft in a rotatable manner is opposed to the shifter member, so that the components constitute a dog clutch.

When the shifter member moves by rotation of the shift drum through the shift fork, the dog clutch immediately meshes between the shifter member and the opposing transmission gear in some cases. In other cases, clutch teeth of the shifter member and the transmission gear abut on each other and do not immediately mesh, but meshes after their relative rotation.

For this reason, there is provided a so-called lost motion mechanism in which a spring for biasing the shifter member toward the transmission gear is installed while play is formed in the guide groove of the shift drum. Here, when the clutch teeth abut on each other, the shifter member is maintained in its position while being biased by the spring to wait for the meshing of the dog clutch. Then, when the dog clutch is ready to mesh, it is meshed at once by the spring load, and the gear is shifted.

Accordingly, since the biasing force of the lost motion spring constantly acts on the shift fork, an engaging pin portion of the shift fork slidably engaging with the guide groove of the shift drum is constantly pressed against one wall surface of the guide groove. This causes rotational friction on the shift drum, which increases the operation load at the time of shifting, and inhibits smooth shifting operations.

SUMMARY OF THE INVENTION

The present invention has been made in view of the above circumstance, and aims to reduce rotational friction on a shift drum caused by a lost motion spring, to thereby reduce the operation load at the time of shifting and provide a drum type-variable speed drive enabling a smoother shifting operation.

According to one aspect of the present invention, a drum type-variable speed drive in which an engaging pin portion of a shift fork pivotally supported by a shift fork shaft in a slidable manner slidably engages with a fork guide groove on the outer peripheral surface of a shift drum and, with rotation of the shift drum, the shift fork moves in the axial direction while being guided by the fork guide groove, to thereby move a shifter member of a transmission engaged with the shift fork and drive the gear shift. Further, the shift fork shaft is supported by an engine case so as to be moveable in the axial direction and a shaft pin is provided on the shift fork shaft so as to protrude toward the shift drum. A shaft guide groove with which the shaft pin slidably engages is formed on the shift drum and spring bearing member, which is restricted from moving in the axial direction of departing from the shift fork by a locking member fixed to the shift fork shaft, is pivotally supported by the shift fork shaft. A lost motion spring is interposed between the spring bearing member and the shift fork. Movement of the shift fork shaft in the axial direction caused by rotation of the shift drum presses the spring bearing member through the locking member, whereby the spring load of the lost motion spring acts on the shift fork.

According to this aspect of the invention, the spring load of the lost motion spring acts on the shift fork through the spring bearing member when the shift fork shaft moves, with rotation of the shift drum, in the axial direction while being guided by the shaft guide groove. Hence, it is possible to prevent the engaging pin portion of the shift fork from being constantly pressed against one wall surface of the guide groove due to the spring load constantly acting on the shift fork. As a result, rotational friction on the shift drum can be made as small as possible, to thereby reduce the operation load at the time of shifting and achieve a smoother shifting operation.

In accordance with another aspect of the invention, a drum type-variable speed drive in which the engaging pin portion of the shift fork pivotally supported by the shift fork shaft in a slidable manner slidably engages with the fork guide groove on the outer peripheral surface of the shift drum and, with rotation of the shift drum, the shift fork moves in the axial direction while being guided by the fork guide groove, to thereby move the shifter member of the transmission engaged with the shift fork and drive the gear shift. Further, the shift fork shaft is supported by the engine case so as to be moveable in the axial direction and the shaft pin is provided on the shift fork shaft so as to protrude toward the shift drum. The shaft guide groove with which the shaft pin slidably engages is formed on the shift drum and a spring bearing member on one side, which is restricted from moving in the axial direction of departing from the shift fork by a locking member on one side fixed to the shift fork shaft, is pivotally supported by the shift fork shaft. A spring bearing member on the other side, which is restricted from moving in the axial direction of approaching the shift fork by a locking member on the other side fixed to the shift fork shaft between the shift fork and the locking member on one side, is pivotally supported by the shift fork shaft. A lost motion spring is compressed and interposed between the spring bearing member on one side and the spring bearing member on the other side. Movement of the shift fork shaft in the axial direction caused by rotation of the shift drum presses the spring bearing member on one side through the locking member on one side, whereby the spring load of the lost motion spring acts on the shift fork through the spring bearing member on the other side.

Accordingly, with rotation of the shift drum, the shift fork shaft moves in the axial direction while being guided by the shaft guide groove, and this movement of the shift fork shaft presses the spring bearing member on one side through the locking member on one side. The spring load of the lost motion spring thus acts on the shift fork through the spring bearing member on the other side. Hence, it is possible to prevent the engaging pin portion of the shift fork from being constantly pressed against one wall surface of the guide groove due to the spring load constantly acting on the shift fork. As a result, rotational friction on the shift drum can be made as small as possible, to thereby reduce the operation load at the time of shifting and achieve a smoother shifting operation.

The lost motion coil spring on the shift fork shaft is compressed and interposed between the spring bearing member, on one side, and spring bearing member, on the other side, which are restricted from moving in axial directions of departing from each other. Hence, when the shift fork shaft does not move in the axial direction, the spring load of the lost motion spring is allowed to not act on the shift fork at all, whereas when the shift fork shaft moves in the axial direction, a required spring load is set to immediately act on the shift fork, so that a smoother and more accurate shifting can be achieved.

Further, the structure where the lost motion spring on the shift fork shaft is compressed and interposed between the spring bearing member, on one side, and spring bearing member, on the other side, which are restricted from moving in axial directions of departing from each other, enables the lost motion mechanism to be sub-assembled onto the shift fork shaft, and allows the drum type-variable speed drive to be assembled more easily.

In further accordance with the present invention, the locking member on the other side is a stopper pin fixed by penetrating the shift fork shaft so as to be orthogonal thereto with both ends slightly protruding therefrom. The spring bearing member on the other side is formed into a cylindrical shape whose inner diameter is substantially the same as the length of the stopper pin, and is freely fitted to the shift fork shaft to cover the stopper pin. The lost motion spring is a lost motion coil spring covering the cylinder outer periphery of the spring bearing member on the other side. A reduced diameter portion of one end opening of the cylinder of the spring bearing member on the other side is locked to the stopper pin, while an enlarged diameter portion of the other end opening bears the lost motion coil spring.

Therefore, the spring bearing member on the other side is formed into a cylindrical shape whose inner diameter is substantially the same as the length of the stopper pin, and is freely fitted to the shift fork shaft to cover the stopper pin fixed by penetrating the shift fork shaft so as to be orthogonal thereto. The reduced diameter portion of one end opening of the cylinder of the spring bearing member on the other side is locked to the stopper pin, and the enlarged diameter portion of the other end opening bears the lost motion coil spring. Accordingly, the lost motion mechanism is configured compactly as a double cylinder structure in which the cylindrical spring bearing member on the other side covers a part of the outer periphery of the shift fork shaft, and the lost motion coil spring covers the outer periphery of the spring bearing member on the other side, and thus the drum type-variable speed drive can be downsized.

Moreover, the lost motion mechanism can be easily sub-assembled onto the shift fork shaft, so that assembly is made easier.

In further accordance with the present invention,
the lost motion spring is provided opposite to the shaft pin with respect to the shift fork on the shift fork shaft and a second lost motion spring is interposed between the shaft pin and the shift fork.

Accordingly, when the shift fork shaft is moved to positions on both sides in the axial direction from the neutral position, the first lost motion spring or second lost motion spring can perform the lost motion function on each side while reducing the operation load at the time of shifting. Thus, the three shift positions including the neutral position can be configured easily with few parts.

In further accordance with the present invention, a second shift fork is provided opposite to the shift fork with respect to the shaft pin on the shift fork shaft and a lost motion spring is arranged opposite to the shaft pin with respect to the second shift fork. By thus supporting two shift forks to one shift fork shaft, the drum type-variable speed drive in which multiple shift positions can be formed can be achieved in a compactly downsized manner with fewer parts, while keeping the assembly work easy.

In further accordance with the present invention, the drum type-variable speed drive is provided in a subtransmission of a power transmission device, which is configured such that a main transmission constantly used during travel, and the subtransmission for switching the output of the main transmission to carry out the final output are combined with an internal combustion engine. Accordingly, gears of the subtransmission in the final reduction stage having small peripheral speed differences can be shifted swiftly, so that operation can be made easier and ride comfort can be improved.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Hereinafter, an embodiment of the present invention will be described with reference to FIGS. 1 to 15.

Figure 1:
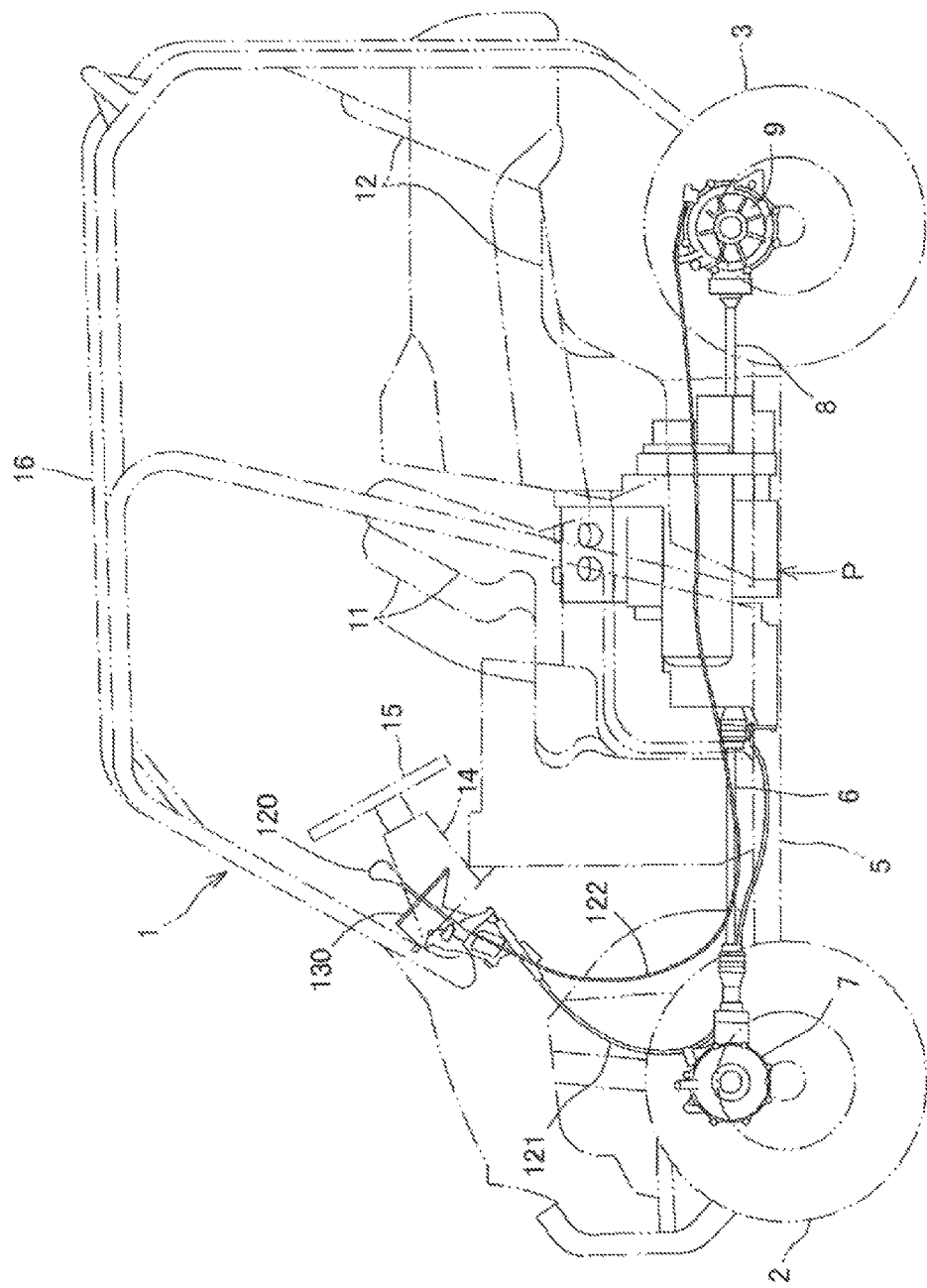
FIG. 1 is an overall side view of a rough terrain vehicle equipped with a power unit according to an embodiment of the present invention.

FIG. 1 shows a side view of a rough terrain vehicle 1 including a power unit according to the embodiment.

Note that in the description of this specification, front, rear, left, and right directions are based on a normal rule that a direction in which the rough terrain vehicle 1 of the embodiment travels straight is the front.

Referring to FIG. 1, in the rough terrain vehicle 1, front wheels 2, 2 and rear wheels 3, 3 on which low-pressure balloon tires for rough terrains are mounted are respectively suspended on the front and rear of left and right body frames 5.

A power unit P is loaded with a crankshaft 21 of an internal combustion engine E disposed in the longitudinal direction, and an output shaft (transmission driven shaft) 51 of the power unit P protrudes to the front and rear in a longitudinal center position of the body frame 5. A rotative power of the output shaft 51 is transmitted to the left and right front wheels 2, 2 from the front end of the output shaft 51 through a front drive shaft 6 and a front differential gear 7, as well as is transmitted to the left and right rear wheels 3, 3 from the rear end of the output shaft through a rear drive shaft 8 and a rear differential gear 9.

Note that a differential locking mechanism is added to the front differential gear 7 and rear differential gear 9, and a clutch for disconnecting power transmission to the front wheels to switch between two-wheel drive and four-wheel drive is assembled in the front differential gear 7.

Three front seats 11 are arranged side by side above the power unit P, and two rear seats 12 are arranged side by side in a rear portion of the body frame 5.

The center seat of the front seats 11 is the driver's seat, and is arranged slightly closer to the front than the left and right seats.

A steering handle 15 is provided so as to protrude from a steering column 14 in front of the driver's seat.

A shift operation lever 120 is arranged in an operation panel 130 in the vicinity of the steering column 14.

A roof 16 covers an area above the front seat 11 and rear seat 12.

The power unit P loaded on the rough terrain vehicle 1 is a power transmission device 20 configured such that a main transmission Tm and a subtransmission Ts are combined with a straight-twin water-cooled 4 stroke internal combustion engine E.

The power unit P is loaded on the body frame 5 in the so-called longitudinal posture where the crankshaft 21 of the internal combustion engine E is disposed in the longitudinal direction of the vehicle.

Figure 3:
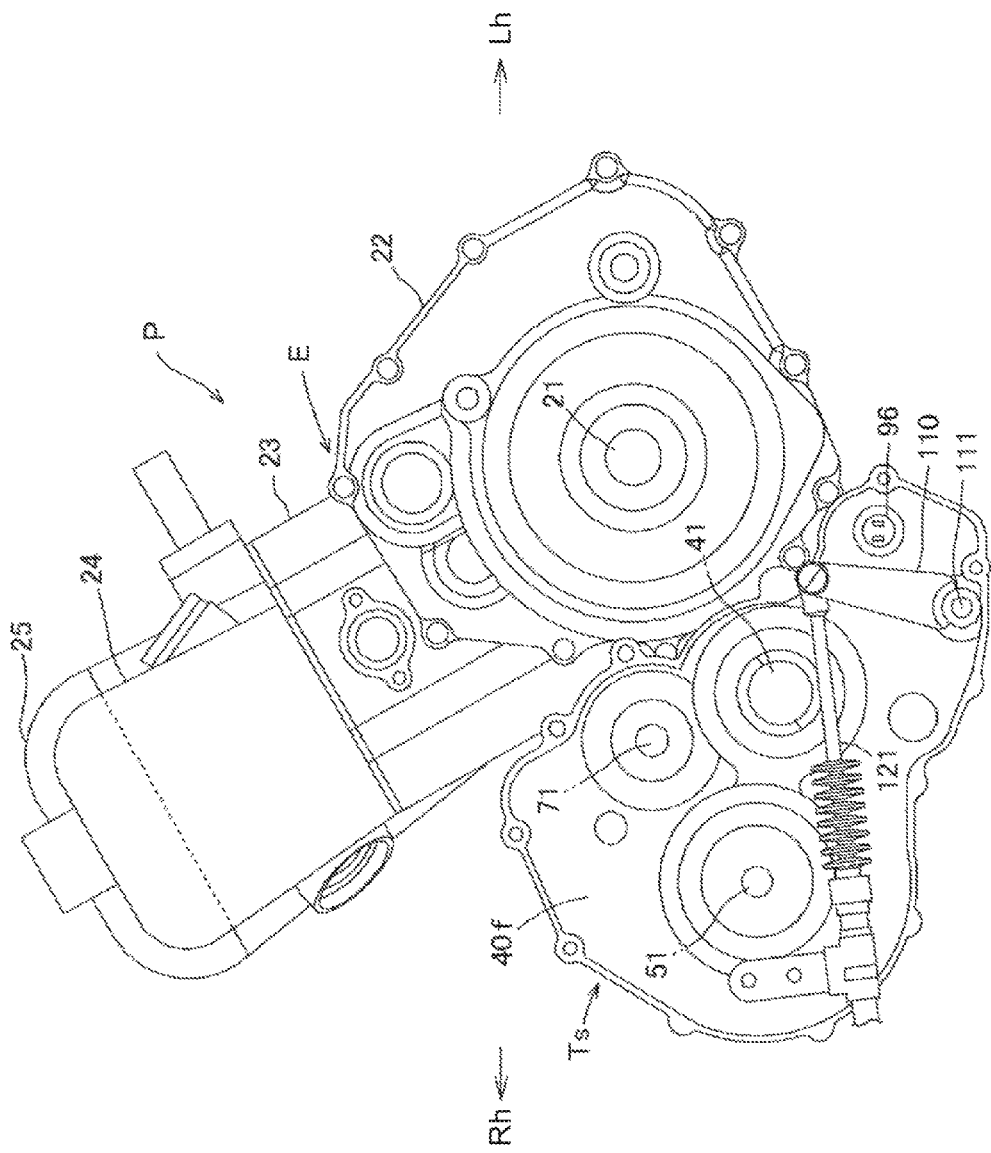
FIG. 3 is a front view of the power unit.

As shown in FIG. 1, a shift cable 121 and a parking cable 122 extend from the shift operation lever 120, and the shift cable 121 is coupled to the tip end of a shift operation lever 110, whose proximal end is fitted to a shift spindle 111 protruding to the front of the subtransmission Ts (see FIG. 3).

Meanwhile, the parking cable 122 extends toward the vehicle rear, and is coupled to an actuator of the differential locking mechanism added to the rear differential gear 9.

Figure 2:
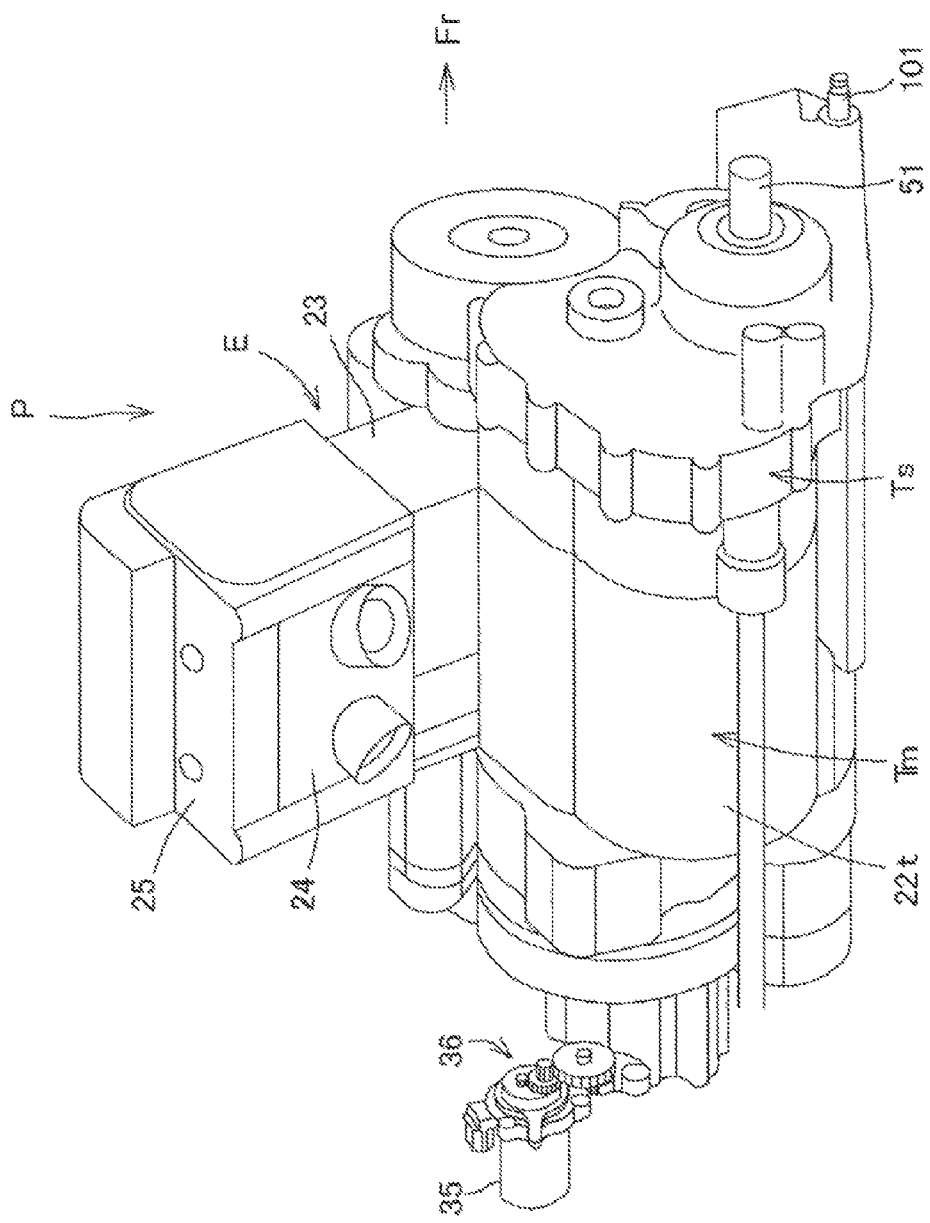
FIG. 2 is an overall perspective view of the power unit.

Referring to FIGS. 2 and 3, in the power unit P, a cylinder block 23, a cylinder head 24, and a cylinder head cover 25 are arranged on top of one another in this order in a diagonally upward direction on the right side of a crankcase 22, which pivotally supports the crankshaft 21 of the internal combustion engine E.

The crankcase 22 constitutes a main transmission case 22t bulging rightward and accommodating the main transmission Tm.

The main transmission Tm is positioned on the right of the crankshaft 21 of the internal combustion engine E, and the subtransmission Ts is installed in a projecting manner in front of the main transmission Tm, so as to substantially overlap therewith.

Figure 5:
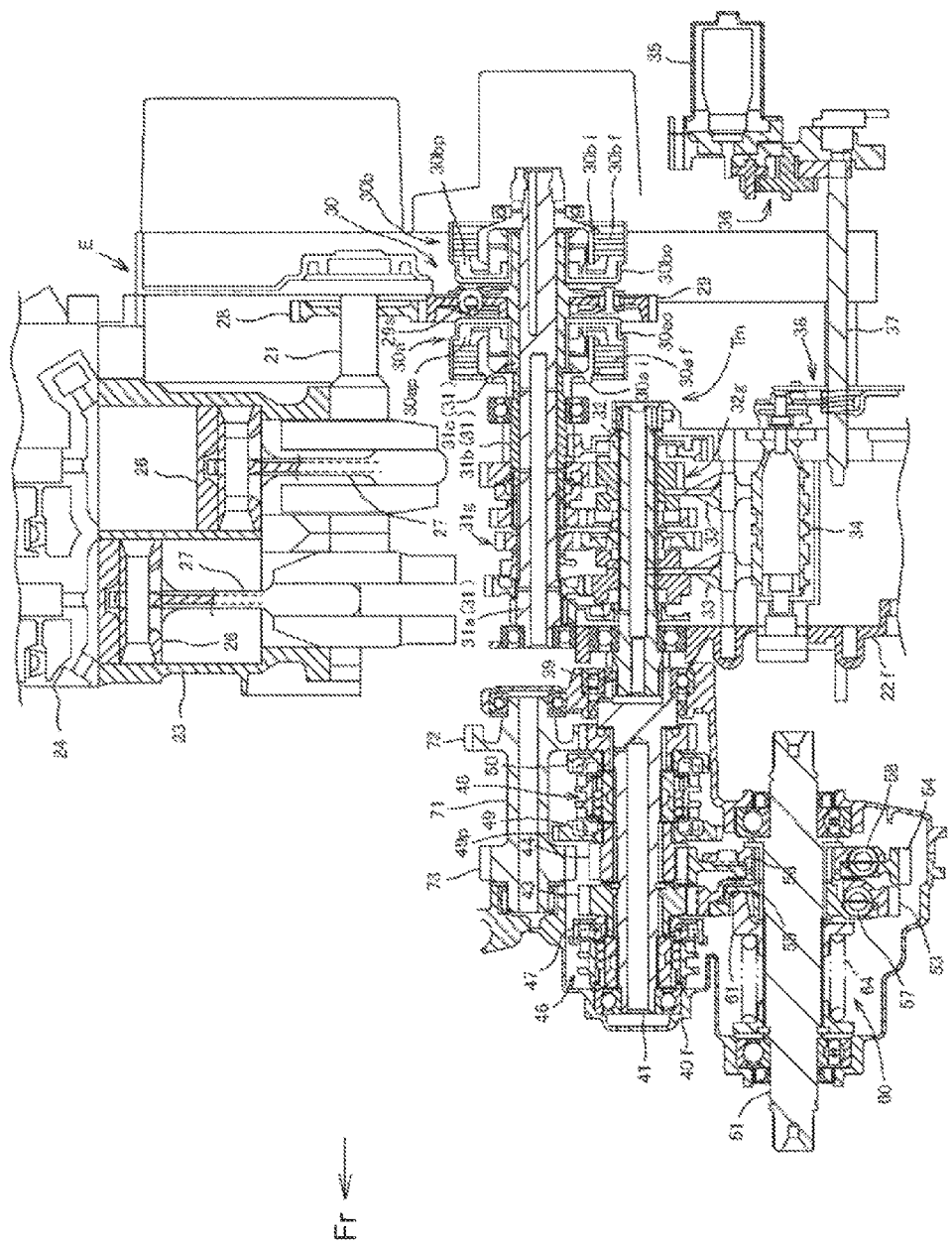
FIG. 5 is a sectional development of a power transmission device showing an entire power transmission system of the power unit.

FIG. 5 shows a sectional view of the entire power transmission device 20.

In the cylinder block 23 of the internal combustion engine E, two cylinders are formed in series at the front and rear, and a connecting rod 27 connects each piston 26 reciprocating in a sliding manner inside the cylinder bore with the crankshaft 21, so that the reciprocating motion of the piston 26 is converted into rotation of the crankshaft 21 and outputted.

A primary driving gear 28 is fitted to a rear end portion of the crankshaft 21 disposed in the longitudinal direction.

A main shaft 31 of the main transmission Tm positioned on the right of the crankshaft 21 is configured such that: a main shaft-outer cylinder 31b and a clutch-outer cylinder 31c are aligned longitudinally and rotatably fitted on the outer periphery of a long main shaft-inner cylinder 31a.

Six driving transmission gears 31g are provided on the main shaft 31, and corresponding six driven transmission gears 32g constantly meshed with the driving transmission gears 31g are provided on a countershaft 32.

The driving transmission gears 31g of the odd gear range are provided on the main shaft-inner cylinder 31a, while the driving transmission gears 31g of the even gear range are provided on the main shaft-outer cylinder 31b.

A paired twin clutch 30 consisting of a first clutch 30a and a second clutch 30b are configured on the clutch-outer cylinder 31c such that: a primary driven gear 29 in the center, as well as clutch outers 30ao, 30bo of the first and second clutches 30a, 30b on both sides thereof are spline-fitted onto the clutch-outer cylinder 31c, thereby being restricted from moving in the axial direction.

The primary driven gear 29 at the center meshes with the primary driving gear 28 provided on the crankshaft 21.

In addition, a clutch damper spring 29s is interposed between the primary driven gear 29 and a central flange portion of the clutch-outer cylinder 31c to absorb torque fluctuation between the primary driven gear 29 and clutch-outer cylinder 31c.

Moreover, a clutch inner 30ai of the first clutch 30a is spline-fitted to the main shaft-inner cylinder 31a so as to be restricted from moving in the axial direction, and a clutch inner 30bi of the second clutch 30b is spline-fitted to the main shaft-outer cylinder 31b so as to be restricted from moving in the axial direction.

A pressing plate 30ap (30bp) is capable of pressing a friction plate group 30af (30bf) in which simultaneously-rotating driving friction plates on the clutch outer 30ao (30bo) side and simultaneously-rotating driven friction plates on the clutch inner 30ai (30bi) side are arranged alternately.

A hydraulic circuit for selectively driving the pressing plates 30ap, 30bp is formed in the main shaft-inner cylinder 31a, clutch-outer cylinder 31c, and right crankcase cover.

When the pressing plate 30ap is driven and the friction plate group 30af is pressed, the first clutch 30a is connected, power inputted to the primary driven gear 29 is transmitted to the main shaft-inner cylinder 31a, and the driving transmission gears 31g of the odd gear range are rotated.

On the other hand, when the pressing plate 30bp is driven and the friction plate group 30bf is pressed, the second clutch 30b is connected, power inputted to the primary driven gear 29 is transmitted to the main shaft-outer cylinder 31b, and the driving transmission gears 31g of the even gear range are rotated.

Two of the six driving transmission gears 31g pivotally supported by the main shaft 31 are shifter gears that slide in the axial direction, and two of the six driven transmission gears 32g pivotally supported by the countershaft 32 are also shifter gears that slide in the axial direction.

Shift forks 33, 33 for moving the two shifter gears on the countershaft 32 are pivotally supported by a shift fork shaft 33a.

Although not shown in the drawing, the shift forks 33, 33 for moving the two shifter gears on the main shaft 31 and the shift fork shaft are also provided.

With rotation of a shift drum 34, the four shift forks 33 move while being guided by guide grooves formed on the outer peripheral surface of the shift drum, to effectively switch the meshing of gears to which power is transmitted.

A transmission motor 35 rotates the shift drum 34.

A drive force of the transmission motor 35 is transmitted to rotation of a shift spindle 37 through a reduction gear mechanism 36, and rotation of the shift spindle 37 is transmitted to rotation of the shift drum 34 through an intermittent feeding mechanism 38.

Accordingly, in the main transmission Tm, hydraulic control of the twin clutch 30 and drive control of the transmission motor 35 allow gears to be shifted while smoothly switching among the first to sixth speed gear range.

The output shaft of the main transmission Tm is the countershaft 32, which penetrates a front wall 22f of the crankcase 22 toward the front and protrudes therefrom.

The power unit P is configured such that the subtransmission Ts is provided in front of the main transmission Tm described above.

The subtransmission Ts is configured inside a front subtransmission case 40f and rear subtransmission case 40r being front and rear parts combined with each other.

Figure 4:
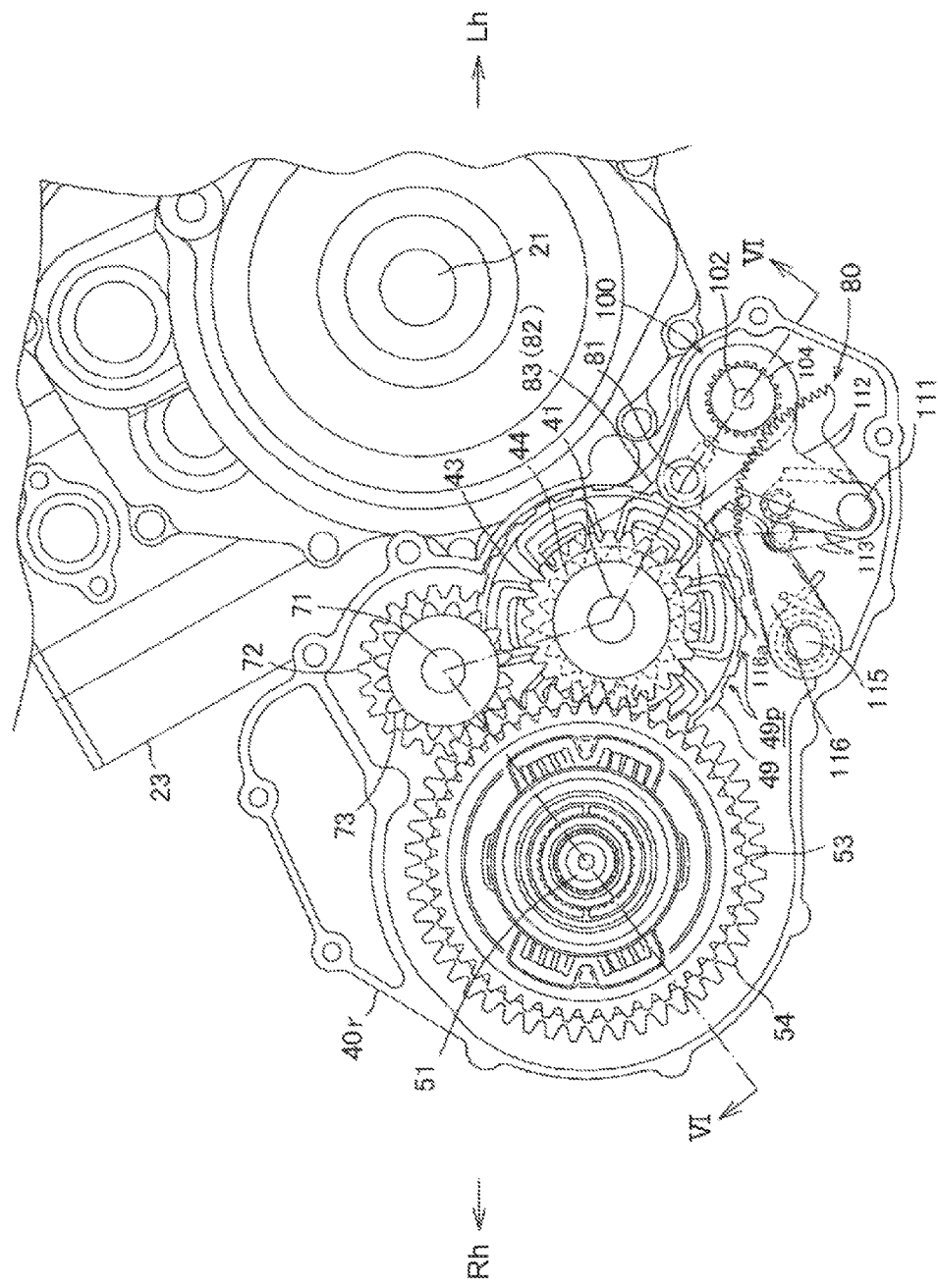
FIG. 4 is a front view of a subtransmission from which a front subtransmission case is detached.

As shown in FIG. 4 being a front view of the subtransmission Ts from which the front subtransmission case 40f is detached, a transmission driving shaft 41 and transmission driven shaft 51 of the subtransmission Ts having transmission gears meshed with each other are arranged side by side, whereas a middle gear shaft 71 is arranged in a position diagonally upward of the transmission driving shaft 41 and transmission driven shaft 51 so as to form a vertex of a triangle.

Figure 6:
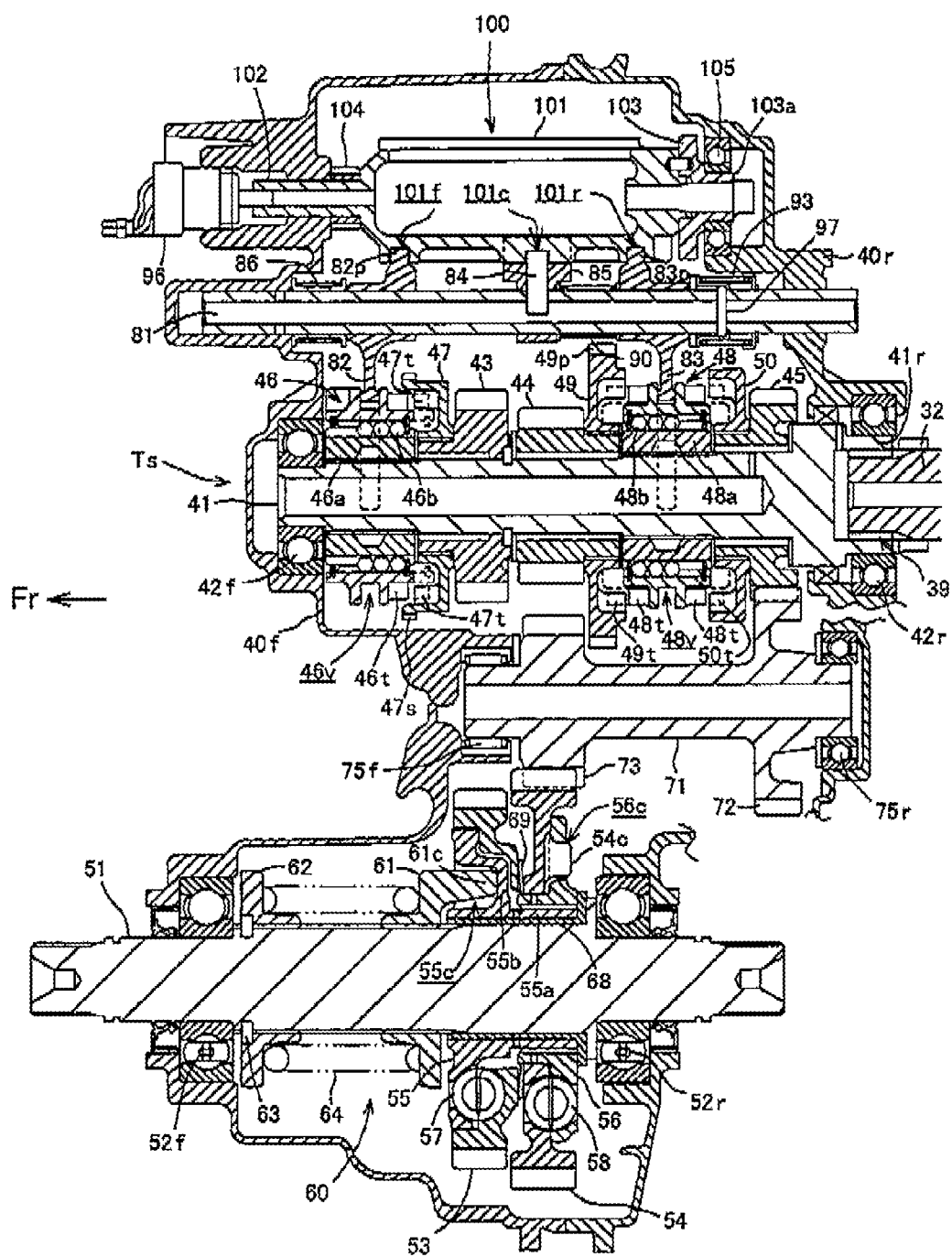
FIG. 6 is a sectional development of the subtransmission (sectional view taken along line VI-VI of FIG. 4)

Referring to FIG. 5 as well as FIG. 6 being a sectional view of the subtransmission Ts, the transmission driving shaft 41, transmission driven shaft 51, and middle gear shaft 71 of the subtransmission Ts are disposed in the longitudinal direction parallel to the crankshaft 21, and their front and rear ends are pivotally supported by the front subtransmission case 40f and rear subtransmission case 40r so as to be installed thereacross.

The transmission driving shaft 41 has its front end pivotally supported by a bearing 42f fitted into a bearing concave portion of the front subtransmission case 40f, and its rear end pivotally supported by a bearing 42r fitted into a bearing hole of the rear subtransmission case 40r, so as to be installed thereacross in a rotatable manner.

A rear end portion of the transmission driving shaft 41 constitutes a rear-end cylinder portion 41r forming a shaft hole of a large diameter. The rear-end cylinder portion 41r has splines formed on its inner circumference, which is exposed toward the rear. A front end portion of the countershaft 32 of the main transmission Tm which penetrates the front wall 22f of the crankcase 22 toward the front and protrudes therefrom and on which splines are formed is fitted into the shaft hole of the rear-end cylinder portion 41r of the transmission driving shaft 41, so as to be coaxially spline-fitted with the transmission driving shaft 41.

Thus, the countershaft 32 on the main transmission Tm side and the transmission driving shaft 41 on the subtransmission Ts side are coaxially connected in a spline-fitting portion 39 as described above, and rotate as a unit.

The transmission driving shaft 41 has in its center a high-speed driving gear 43 and a low-speed driving gear 44 aligned longitudinally and pivotally supported in a rotatable manner, and also has in its rear portion a reverse driving gear 45 pivotally supported in a rotatable manner.

Additionally, a high-speed switch clutch mechanism consisting of a high-speed switch shifter member 46 is provided on the transmission driving shaft 41 between the bearing 42f at the front end and the high-speed driving gear 43.

The high-speed switch shifter member 46 is pivotally supported so as to be movable in the axial direction, through a direct drive bearing 46b, to the outer periphery of a cylinder base portion 46a spline-fitted to a predetermined position of the transmission driving shaft 41 in the axial direction. Additionally the high-speed switch shifter member has an annular shift fork groove 46v formed in its center, and clutch teeth 46t formed so as to extend rearward from the shift fork groove 46v.

A high-speed transmission clutch receiving member 47 fitted into the high-speed driving gear 43 is provided opposite to the rear of the high-speed switch shifter member 46. Clutch teeth 47t are formed in the high-speed transmission clutch receiving member 47 in correspondence with the clutch teeth 46t of the high-speed switch shifter member 46 so that the teeth can mesh with each other and constitute a dog clutch.

Hence, when the high-speed switch shifter member 46 moves rearward, the clutch teeth 46t mesh with the clutch teeth 47t of the high-speed transmission clutch receiving member 47 fitted into the high-speed driving gear 43 to rotate the high-speed driving gear 43 together with the transmission driving shaft 41, whereas when the high-speed switch shifter member 46 is at the front, power is not transmitted to the high-speed driving gear 43.

Note that the high-speed transmission clutch receiving member 47 has multiple projections 47s formed on its outer peripheral surface at equal intervals, and a speed sensor (not shown) detects the projections 47s to detect vehicle speed.

Meanwhile, a low-speed and reverse switch clutch mechanism consisting of a low-speed and reverse switch shifter member 48 is provided on the transmission driving shaft 41 between the low-speed driving gear 44 and reverse driving gear 45.

The low-speed and reverse switch shifter member 48 is pivotally supported so as to be movable in the axial direction, through a direct drive bearing 48b, to the outer periphery of a cylinder base portion 48a spline-fitted to a predetermined position of the transmission driving shaft 41 in the axial direction. Additionally, the low-speed and reverse switch shifter member has a shift fork groove 48v formed between clutch teeth 48t, 48t respectively formed so as to extend frontward and rearward.

A low-speed transmission clutch receiving member 49 fitted into the low-speed driving gear 44 is provided opposite to the front of the low-speed and reverse switch shifter member 48. Clutch teeth 49t are formed in the low-speed transmission clutch receiving member 49 in correspondence with the front clutch teeth 48t of the low-speed and reverse switch shifter member 48 so that the teeth can mesh with each other to constitute a dog clutch.

Additionally, a reverse clutch receiving member 50 fitted into the reverse driving gear 45 is provided opposite to the rear of the low-speed and reverse switch shifter member 48. Clutch teeth 50t are formed in the reverse clutch receiving member 50 in correspondence with the rear clutch teeth 48t of the low-speed and reverse switch shifter member 48 so that the teeth can mesh with each other and constitute a dog clutch.

Hence, when the low-speed and reverse switch shifter member 48 moves forward, the front clutch teeth 48t mesh with the clutch teeth 49t of the low-speed transmission clutch receiving member 49 fitted into the low-speed driving gear 44 to rotate the low-speed driving gear 44 together with the transmission driving shaft 41, whereas when the low-speed and reverse switch shifter member 48 moves rearward, the rear clutch teeth 48t mesh with the clutch teeth 50t of the reverse clutch receiving member 50 fitted into the reverse driving gear 45 to rotate the reverse driving gear 45 together with the transmission driving shaft 41.

When the low-speed and reverse switch shifter member 48 is positioned in the center between the low-speed transmission clutch receiving member 49 and reverse clutch receiving member 50 without meshing with any of them, rotation of the transmission driving shaft 41 is not transmitted to any of the low-speed driving gear 44 and the reverse driving gear 45.

Note that the low-speed transmission clutch receiving member 49 has multiple locking grooves 49p for parking formed on its outer peripheral surface in the circumferential direction for use in parking.

The transmission driven shaft 51 arranged on the right of the transmission driving shaft 41 in parallel thereto has its front portion pivotally supported by penetrating a bearing 52f fitted into a bearing hole of the front subtransmission case 40f, and its rear portion pivotally supported by penetrating a bearing 52r fitted into a bearing hole of the rear subtransmission case 40r, so as to be rotatably installed thereacross with its front and rear ends protruding to the front and rear.

The transmission driven shaft 51 not only is the output shaft 51 of the subtransmission Ts, but is also the output shaft 51 of the power unit P.

A high-speed driven gear 53 and low-speed driven gear 54 constantly meshed with the high-speed driving gear 43 and low-speed driving gear 44 pivotally supported by the transmission driving shaft 41 are pivotally supported by the transmission driven shaft (see FIG. 6).

A first intermediary rotating member 55 is interposed between the high-speed driven gear 53 and transmission driven shaft 51, while being pivotally supported by the transmission driven shaft 51 such that the first intermediary rotating member and transmission driven shaft can rotate relative to each other.

In the first intermediary rotating member 55, a cylindrical boss portion 55a is pivotally supported in a rotatable manner by the transmission driven shaft 51 through a bushing 68 being a cylindrical bearing, and four cam concave portions 55c opened frontward are formed in a spoke portion 55b formed in the front half of the cylindrical boss portion 55a (see FIG. 6).

The high-speed driven gear 53 is pivotally supported to the outer periphery of the spoke portion 55b of the first intermediary rotating member 55, such that the two can rotate relative to each other. A damper spring 57 is interposed between the high-speed driven gear 53 and first intermediary rotating member 55.

Accordingly, rotation of the high-speed driven gear 53 is transmitted to the first intermediary rotating member 55 through the damper spring 57, while the damper spring 57 absorbs torque fluctuation between the high-speed driven gear 53 and first intermediary rotating member 55.

In addition, a second intermediary rotating member 56 is serration-fitted to the outer periphery of the rear half of the cylindrical boss portion 55a of the first intermediary rotating member 55, so as to integrally rotate with the first intermediary rotating member 55.

Four arc-shaped through holes 56c are formed in a spoke portion of the second intermediary rotating member 56.

The low-speed driven gear 54 is pivotally supported to the outer periphery of the spoke portion of the second intermediary rotating member 56, such that the two can rotate relative to each other. A damper spring 58 is interposed between the low-speed driven gear 54 and second intermediary rotating member 56.

Accordingly, rotation of the low-speed driven gear 54 is transmitted to the second intermediary rotating member 56 through the damper spring 58, while the damper spring 58 absorbs torque fluctuation between the low-speed driven gear 54 and second intermediary rotating member 56.

Note that convex portions 54c protruding rearward from a spoke portion of the low-speed driven gear 54 enter the through holes 56c of the second intermediary rotating member 56 with margin, to limit the relative rotation range.

Since the second intermediary rotating member 56 rotates integrally with the first intermediary rotating member 55, the damper spring 58a (58b) also absorbs torque fluctuation between the low-speed driven gear 54 and first intermediary rotating member 55.

In addition, a disc spring 69 is interposed between the high-speed driven gear 53 and low-speed driven gear 54 arranged adjacent to each other.

Moreover, the transmission driven shaft 51 has a cam-type torque damper 60 provided between itself and the first intermediary rotating member 55.

On the front side of the first intermediary rotating member 55 on the transmission driven shaft 51, a male cam member 61 is spline-fitted so as to be restricted from rotating relative thereto, while being pivotally supported thereto so as to be slidable in the axial direction. The male cam member 61 has rearwardly-protruding cam convex portions 61c, 61c opposed to the cam concave portions 55c, 55c of the first intermediary rotating member 55 that faces the rear of the male cam member 61.

The cam convex portions 61c, 61c of the male cam member 61 are each formed in a protruding manner, and has a cam surface which is a side surface facing the rotation direction and being inclined toward the rear.

A spring bearing member 62 restricted from moving forward by a snap ring 63 is spline-fitted to the transmission driven shaft 51 in front of the male cam member 61. A coil spring 64 is interposed between the spring bearing member 62 and male cam member 61 (see FIG. 6).

Accordingly, the cam-type torque damper 60 is configured such that the male cam member 61 is biased rearward by the coil spring 64, and has the cam convex portions 61c, 61c inserted in the cam concave portions 55c, 55c of the first intermediary rotating member 55, so that the cam surfaces of the cam convex portions 61c, 61c come into contact with the surfaces of the cam concave portions 55c, 55c in the rotation direction.

Referring to FIG. 6, the middle gear shaft 71 positioned diagonally upward of the transmission driving shaft 41 and transmission driven shaft 51 has its front end pivotally supported by a bearing 75f fitted into a bearing concave portion of the front subtransmission case 40f, and its rear end pivotally supported by a bearing 75r fitted into a bearing concave portion of the rear subtransmission case 40r, so as to be rotatably installed thereacross.

The middle gear shaft 71 has a large-diameter middle gear 72 formed in its rear portion, and a small-diameter middle gear 73 formed in its front portion. Here, the large-diameter middle gear 72 on the rear side meshes with the reverse driving gear 45 pivotally supported in a rotatable manner by the transmission driving shaft 41, and the small-diameter middle gear 73 on the front side meshes with the low-speed driven gear 54 pivotally supported in a rotatable manner by the transmission driven shaft 51 (see FIG. 6).

A drum type-variable speed drive 80 for moving the high-speed switch shifter member 46 and low-speed and reverse switch shifter member 48 on the transmission driving shaft 41 in the axial direction, is provided in a lower part on the left of the transmission driving shaft 41, i.e., a lower part on the crankshaft 21 side.

A shift fork shaft 81, which penetrates a high-speed switch shift fork 82 fitted to the shift fork groove 46v of the high-speed switch shifter member 46 and a low-speed and reverse switch shift fork 83 fitted to the shift fork groove 48v of the low-speed and reverse switch shifter member 48 while pivotally supporting them so as to be slidable in the axial direction, has its front and rear ends supported by the front subtransmission case 40f and rear subtransmission case 40r, in a manner as to be installed thereacross at a position on the left and diagonally downward of the transmission driving shaft 41 (see FIGS. 4 and 6).

Figure 7:
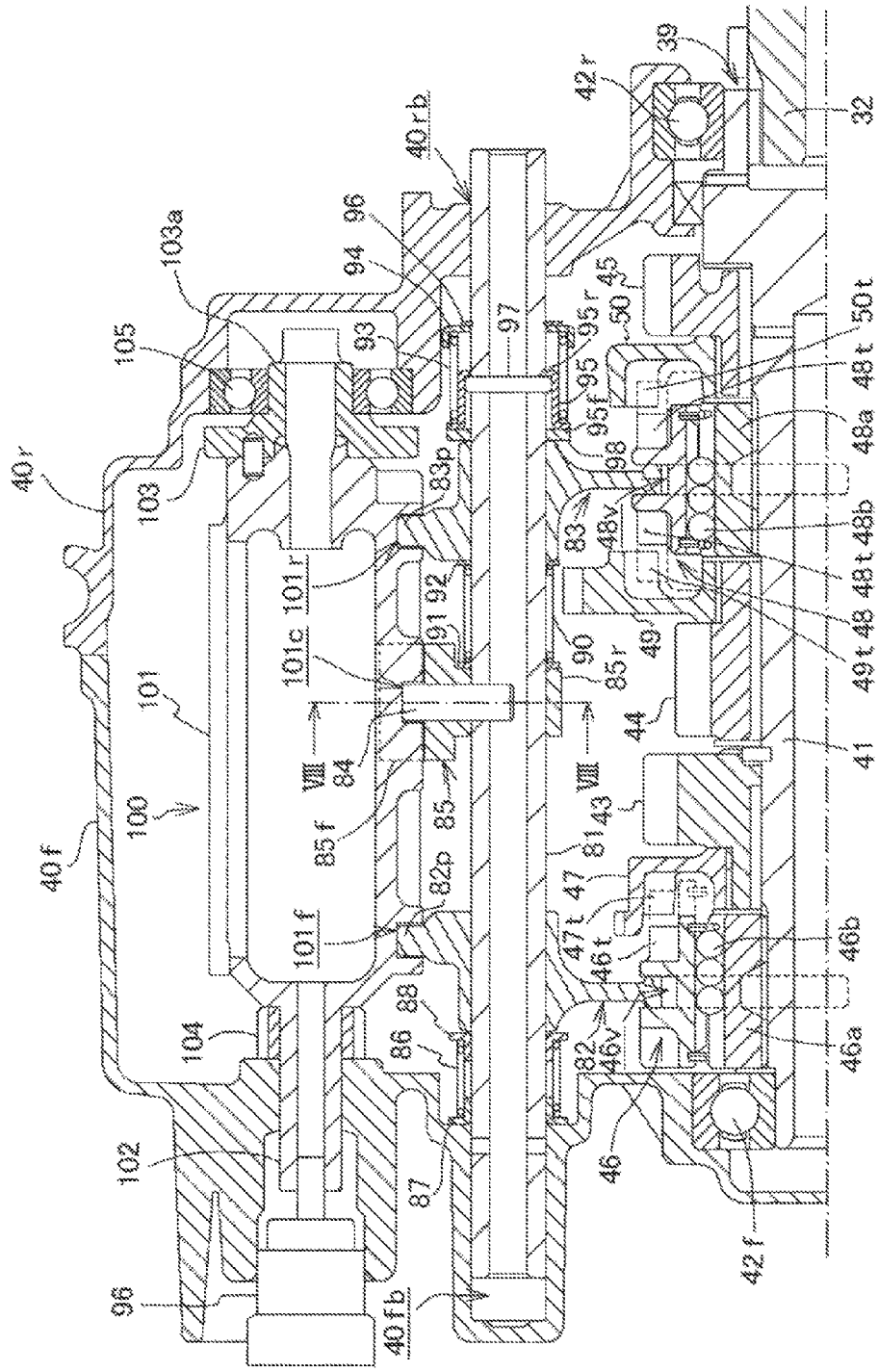
FIG. 7 is an enlarged sectional view of a main part of the subtransmission in a neutral state.

Referring to FIG. 7, the shift fork shaft 81 is formed into a tubular shape having an oil passage formed therein, and its front end is slidably inserted into a deep bearing concave portion 40fb of the front subtransmission case 40f, whereas its rear end slidably penetrates a bearing hole 40rb of the rear subtransmission case 40r.

Hence, the shift fork shaft 81 is pivotally supported by the bearing concave portion 40fb and bearing hole 40rb so as to be slidable in the front and rear axial directions.

A shift drum 100 is provided further left and diagonally downward of the shift fork shaft 81 (see FIG. 4).

The shift fork shaft 81 has, around the center between the high-speed switch shift fork 82 and low-speed and reverse switch shift fork 83, a shaft pin 84 held in a pin holder 85 and protruding toward the shift drum 100 in the shaft diameter direction.

Figure 8:
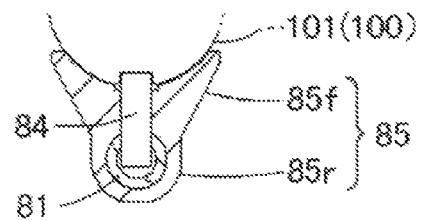
FIG. 8 is a sectional view taken along line VIII-VIII of FIG. 7.

Referring to FIG. 8, the pin holder 85 is configured of a ring portion 85r fitted over the shift fork shaft 81, and an arc-shaped fork portion 85f protruding toward the shift drum 100 from the ring portion 85r.

The fork portion 85f of the pin holder 85 has an arc shape whose inner diameter is equal to the outer diameter of the shift drum 100, and fits to the outer peripheral surface of a drum main body 101 of the shift drum 100 while allowing rotation of the shift drum 100.

The shaft pin 84 is provided integrally with the shift fork shaft 81 and moves integrally therewith, while being press-fitted by the pin holder 85 and shift fork shaft 81 with its tip end protruding from the center inner face of the fork portion 85f of the pin holder 85.

Referring to FIG. 7, the shift drum 100 has a drum rotary shaft 102 protruding frontward from the front end of the cylindrical drum main body 101 and penetrating the front subtransmission case 40f so as to be pivotally supported thereby in a rotatable manner. Meanwhile, a flower-shaped cam 103 is fixed to the rear end of the drum main body 101, and a drum rotary shaft 103a protruding to the rear of the flower-shaped cam 103 is pivotally supported by a bearing concave portion of the rear subtransmission case 40r through a bearing 105.

A shift drum input gear 104 extending along the inner face of the front subtransmission case 40f is fitted into a drum spindle 102 protruding to the front of the shift drum 100.

Additionally, the protruding front end of the drum spindle 102 having penetrated the front subtransmission case 40f is coaxially connected to a driving shaft of a shift position sensor 96, so that the shift position sensor 96 can detect the rotation angle of the shift drum 100.

Fork guide grooves 101f, 101r having predetermined shapes along the circumferential direction are formed at the front and rear of the outer peripheral surface of the drum main body 101, and a shaft guide groove 101c having a predetermined shape in the circumferential direction is formed in the center between the fork guide grooves 101f, 101r.

Figure 9:
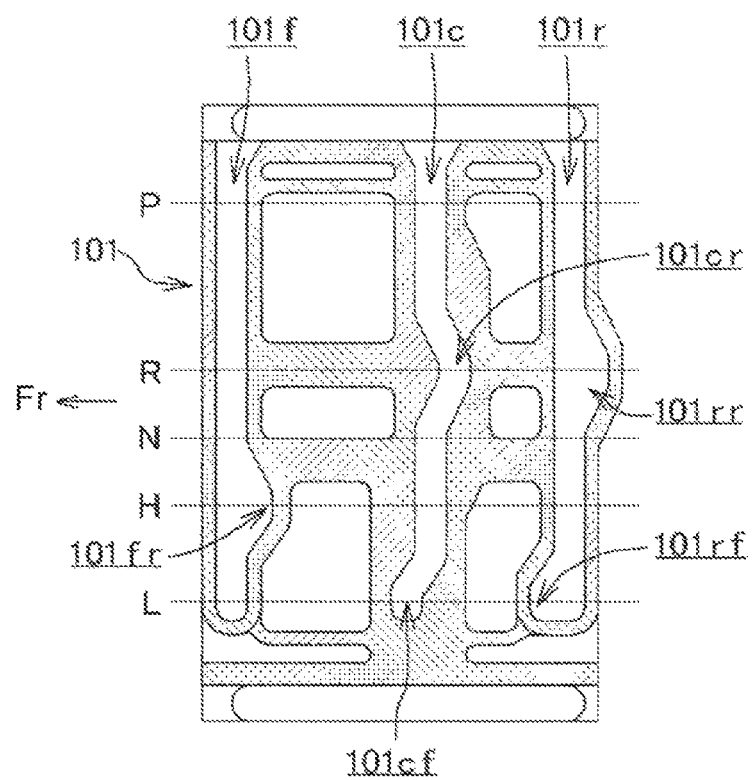
FIG. 9 is a development of the outer peripheral surface of a drum main body of a shift drum.

FIG. 9 is a development of the outer peripheral surface of the drum main body 101.

As shown in the development of FIG. 9, the fork guide groove 101f, shaft guide groove 101c, and fork guide groove 101r are formed in this order in the longitudinal direction, while six positions including a parking position P, reverse position R, neutral position N, high-speed position H, and low-speed position L are set in this order in the circumferential direction.

Referring to FIG. 9, when the positions of the fork guide groove 101f, shaft guide groove 101c, and fork guide groove 101r in the parking position P are used as a base, a rearwardly-shifted groove portion 101cr where the shaft guide groove 101c is shifted rearward, and a rear play space 101rr where the groove width of the fork guide groove 101r expands rearward are formed in the reverse position R.

The guide grooves 101f, 101c, 101r are in the base position in the neutral position N, a rear play space 101fr where the groove width of the fork guide groove 101f expands rearward is formed in the high-speed position H, and a frontwardly-shifted groove portion 101cf where the shaft guide groove 101c is shifted frontward as well as a front play space 101rf where the groove width of the fork guide groove 101r expands frontward are formed in the low-speed position L.

Referring to FIG. 7, engaging pin portions 82p, 83p respectively protruding from the high-speed switch shift fork 82 and low-speed and reverse switch shift fork 83 slidably engage with the above-mentioned fork guide grooves 101f, 101r of the shift drum 100, while the protruding tip end portion of the shaft pin 84 slidably engages with the shaft guide groove 101c.

Accordingly, with rotation of the shift drum 100, the high-speed switch shift fork 82 and low-speed and reverse switch shift fork 83 move in front and rear axial directions while being guided by the fork guide grooves 101f, 101r, respectively, to move the high-speed switch shifter member 46 and low-speed and reverse switch shifter member 48, whereas the shaft pin 84 moves in front and rear axial directions while being guided by the shaft guide groove 101c to integrally move the shift fork shaft 81 in the axial direction.

The shift spindle 111 has its front and rear pivotally supported by the front subtransmission case 40f and rear subtransmission case 40r in a rotatable manner so as to be installed thereacross, below the shift fork shaft 81 (see FIG. 4). The proximal end of the shift operation lever 110 is fitted into the front end of the shift spindle 111 penetrating the front subtransmission case 40f and protruding frontward (see FIG. 3).

The tip end of the shift operation lever 110 is connected to the shift cable 121 extending from the shift operation lever 120 arranged in the operation panel 130, so that the shift spindle 111 can rotate with an operation of the shift operation lever 120.

Referring to FIG. 4, a sector gear shift arm 112 is fitted into a predetermined position on the shift spindle 111, and meshes with the shift drum input gear 104 fitted into the drum rotary shaft 102 protruding to the front of the shift drum 100.

Hence, with an operation of the shift operation lever 120, the shift spindle 111 rotates through the shift cable 121, and the shift drum 100 also rotates through the meshing of the gear shift arm 112 and shift drum input gear 104.

Referring to FIG. 4, note that a parking locking lever 116 is pivotally supported by a spindle 115 in a swingable manner below the low-speed transmission clutch receiving member 49, so as to be capable of locking a locking protrusion 116a into the locking groove 49p for parking. Here, a parking driving mechanism is provided where a parking actuator arm 113 swung by rotation of the shift spindle 111 operated by the shift operation lever 120 acts on the parking locking lever 116, so that the locking protrusion 116a is locked into the locking groove 49p for parking to restrict rotation of the low-speed transmission clutch receiving member 49 and achieve the parked state.

When the shift drum 100 rotates with an operation of the shift operation lever 120, the high-speed switch shift fork 82 and low-speed and reverse switch shift fork 83 move in the axial direction while being guided by the fork guide grooves 101f, 101r. At the time of this movement, the lost motion mechanism works to smooth out the shifting.

Referring to FIG. 7, a lost motion coil spring 86 having both ends bore by spring bearing members 87, 88 is provided on the shift fork shaft 81, interposed between the high-speed switch shift fork 82 and an open end of the bearing concave portion 40fb of the front subtransmission case 40f.

Here, a conventional lost motion mechanism is configured such that: the spring bearing members 87, 88 are pivotally supported by the shift fork shaft 81 in a slidable manner; the front spring bearing member 87 abuts on the open end of the bearing concave portion 40fb of the front subtransmission case 40f, while the rear spring bearing member 88 abuts on the high-speed switch shift fork 82; and the spring load of the lost motion coil spring 86 constantly acts on the high-speed switch shift fork 82.

Additionally, a lost motion coil spring 90 having both ends bore by spring bearing members 91, 92 is provided on the shift fork shaft 81, interposed between the low-speed and reverse switch shift fork 83 and the ring portion 85r of the pin holder 85 that fixedly holds the shaft pin 84 to the shift fork shaft 81.

The spring bearing members 91, 92 are pivotally supported by the shift fork shaft 81 in a slidable manner. The front spring bearing member 91 is restricted from moving in the axial direction of departing from the low-speed and reverse switch shift fork 83 by the pin holder 85 fixed to the shift fork shaft 81, and the rear spring bearing member 92 is capable of abutting on the low-speed and reverse switch shift fork 83.

When the pin holder 85 (as well as the shaft pin 84) and low-speed and reverse switch shift fork 83 are in the base position (state shown in FIG. 7), the lost motion mechanism according to the present invention is formed, where the lost motion coil spring 90 is generally in a state just before the fully stretched state and the rear spring bearing member 92 is in contact with the low-speed and reverse switch shift fork 83, so that the spring load of the lost motion coil spring 90 is extremely small and hardly acts on the low-speed and reverse switch shift fork 83.

Moreover, a lost motion coil spring 93 is compressed and interposed between front and rear spring bearing members 95, 94 on the shift fork shaft 81, behind the low-speed and reverse switch shift fork 83 and in front of the bearing hole 40rb of the rear subtransmission case 40r.

The rear spring bearing member 94 is pivotally supported by the shift fork shaft 81, while being restricted from moving in the axial direction of departing from the low-speed and reverse switch shift fork 83 by a circlip 96, which is a locking member fixedly fitted into the shift fork shaft 81.

A stopper pin 97 being a locking member penetrates the shift fork shaft 81 so as to be orthogonal thereto and is thereby restricted from moving in the axial direction with both ends slightly protruding therefrom, behind the low-speed and reverse switch shift fork 83 and in front of the rear spring bearing member 94.

The front spring bearing member 95 is formed into a cylindrical shape whose inner diameter is substantially the same as the length of the stopper pin 97, and is freely fitted to the shift fork shaft 81 to cover the stopper pin 97. Then, the lost motion coil spring 93 covers the cylinder outer periphery of the front spring bearing member 95.

In the front spring bearing member 95, a reduced diameter portion 95r of a rear end opening of the cylinder is locked to both of the protruding ends of the stopper pin 97 from the rear, and an enlarged diameter portion 95f of a front end opening of the cylinder bears the front end of the lost motion coil spring 93.

The lost motion coil spring 93 is extended further rearward than the front spring bearing member 95, and has its rear end bore by the rear spring bearing member 94.

Specifically, the lost motion coil spring 93 is compressed and interposed between the front spring bearing member 95 and rear spring bearing member 94, which are restricted from moving in directions of departing from each other by the stopper pin 97 and circlip 96, on the shift fork shaft 81.

When the low-speed and reverse switch shift fork 83 is in the base position (state shown in FIG. 7), the front spring bearing member 95 is in a position where it is restricted from moving frontward by the stopper pin 97, and has a washer 98 interposed between itself and the low-speed and reverse switch shift fork 83.

Accordingly, when the low-speed and reverse switch shift fork 83 is in the base position, the lost motion mechanism according to the present invention is formed, where the spring load of the lost motion coil spring 93 does not act on the low-speed and reverse switch shift fork 83 at all.

Hereinafter, shifting operations of the subtransmission Ts will be described with reference to FIGS. 7, 9 and 10 to 15.

FIG. 7 shows a neutral state of the subtransmission Ts when the shift operation lever 120 is in a neutral position. Here, the fork guide grooves 101f, 101r of the shift drum 100 respectively guide the high-speed switch shift fork 82 and low-speed and reverse switch shift fork 83 to the neutral position N being the base position, and the shaft guide groove 101c guides the shift fork shaft 81, through the shaft pin 84, to the neutral position N being the base position (see FIG. 9).

When the shift operation lever 120 is operated to a high-speed forward position from the neutral state of the subtransmission Ts, the shift drum 100 rotates such that the high-speed switch shift fork 82, shift fork shaft 81, and low-speed and reverse switch shift fork 83 are guided to axial positions on the guide grooves 101f, 101c, 101r indicating the high-speed position H in the outer peripheral surface-development of the drum main body 101 of FIG. 9.

Although the shift fork shaft 81 and low-speed and reverse switch shift fork 83 are maintained in the base position and do not move, the engaging pin portion 82p of the high-speed switch shift fork 82 faces the rear play space 101fr where the groove width of the fork guide groove 101f expands rearward (see FIG. 9). Hence, the high-speed switch shift fork 82 constantly biased rearward by the lost motion coil spring 86 is capable of moving rearward together with the high-speed switch shifter member 46 engaged therewith.

Figure 10:
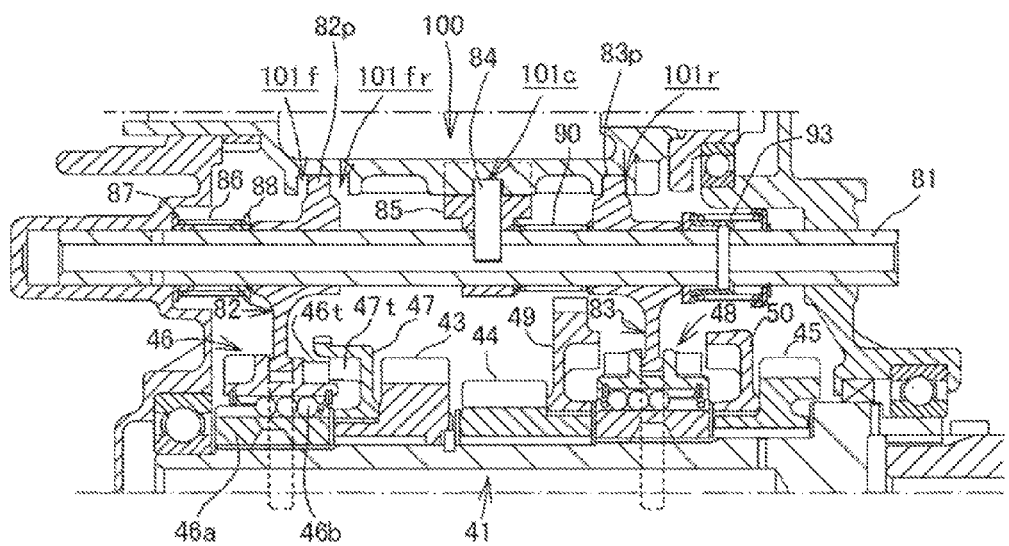
FIG. 10 is a sectional view of a main part of the subtransmission in the course of shifting from the neutral state to a high-speed forward state.

When the high-speed switch shifter member 46 moves rearward, its clutch teeth 46t may mesh with the clutch teeth 47t of the high-speed transmission clutch receiving member 47 if the timing is right. However, if the clutch teeth 46t abut on the clutch teeth 47t instead of meshing therewith, as shown in FIG. 10, the high-speed switch shift fork 82 and high-speed switch shifter member 46 stop after moving slightly rearward without fully entering the rear play space 101fr, and wait for the clutch to mesh by relative rotation of the high-speed switch shifter member 46 and high-speed transmission clutch receiving member 47, while receiving the spring load of the lost motion coil spring 86.

Figure 11:
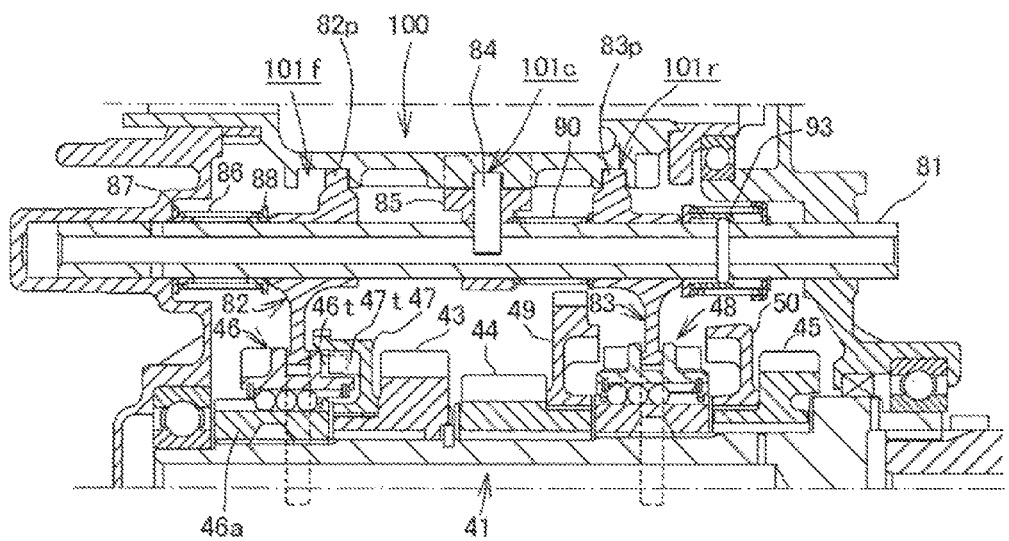
FIG. 11 is a sectional view of the main part of the subtransmission in the high-speed forward state.

Then, when the clutch teeth 46t and clutch teeth 47t come off from each other after relative rotation of the high-speed switch shifter member 46 and high-speed transmission clutch receiving member 47, as shown in FIG. 11, the high-speed switch shift fork 82 and high-speed switch shifter member 46 move rearward by the spring load of the lost motion coil spring 86, and the clutch teeth 46t and clutch teeth 47t mesh with each other. Thus, rotation of the transmission driving shaft 41 is transmitted to the high-speed transmission clutch receiving member 47 and high-speed driving gear 43 through the high-speed switch shifter member 46, whereby the high-speed driven gear 53 meshed with the high-speed driving gear 43 rotates to achieve the high-speed forward state.

As has been described, the lost motion mechanism configured of the lost motion coil spring 86 enables the dog clutch configured of the high-speed switch shifter member 46 and high-speed transmission clutch receiving member 47 to mesh flawlessly. Hence, the subtransmission Ts can be shifted smoothly from the neutral state to the high-speed forward state.

Next, when the shift operation lever 120 is operated to a low-speed forward position from the high-speed forward state, the shift drum 100 rotates such that the high-speed switch shift fork 82, shift fork shaft 81, and low-speed and reverse switch shift fork 83 are guided to axial positions on the guide grooves 101f, 101c, 101r indicating the low-speed position L in the outer peripheral surface-development of the drum main body 101 of FIG. 9.

Figure 12:
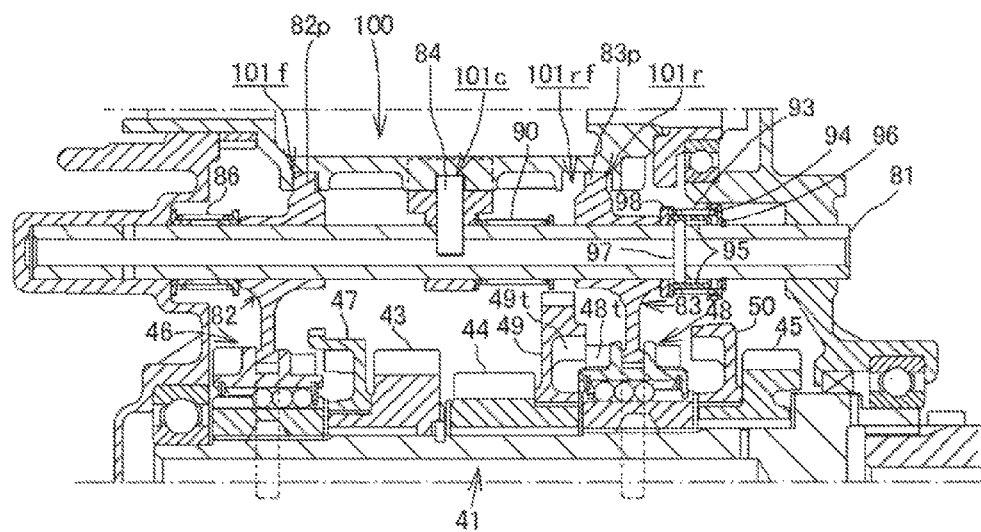
FIG. 12 is a sectional view of the main part of the subtransmission in the course of shifting from the high-speed forward state to a low-speed forward state.

Specifically, as shown in FIG. 12, the high-speed switch shift fork 82 moves forward back to the base position while being guided by the fork guide groove 101f, whereby the dog clutch configured of the high-speed switch shifter member 46 and high-speed transmission clutch receiving member 47 is disengaged.

Then, since the shift fork shaft 81 moves forward while being guided by the frontwardly-shifted groove portion 101cf where the shaft guide groove 101c is shifted frontward, the stopper pin 97 and the rear spring bearing member 94 of the lost motion coil spring 93 move forward, together with the shift fork shaft 81. Accordingly, instead of the stopper pin 97, the spring load of the lost motion coil spring 93 acts on the low-speed and reverse switch shift fork 83 through the front spring bearing member 95 and washer 98.

The engaging pin portion 83p of the low-speed and reverse switch shift fork 83 faces the front play space 101rf where the groove width of the fork guide groove 101r expands frontward (see FIG. 9). Hence, the low-speed and reverse switch shift fork 83 biased frontward by the lost motion coil spring 93 is capable of moving forward together with the low-speed and reverse switch shifter member 48 engaged therewith.

When the low-speed and reverse switch shifter member 48 moves forward, its front clutch teeth 48t may mesh with the clutch teeth 49t of the low-speed transmission clutch receiving member 49 if the timing is right. However, if the clutch teeth 48t abut on the clutch teeth 49t instead of meshing therewith, as shown in FIG. 12, the low-speed and reverse switch shift fork 83 and low-speed and reverse switch shifter member 48 stop after moving slightly forward without fully entering the front play space 101rf, and wait for the clutch to mesh by relative rotation of the low-speed and reverse switch shifter member 48 and low-speed transmission clutch receiving member 49, while receiving the spring load of the lost motion coil spring 93.

Figure 13:
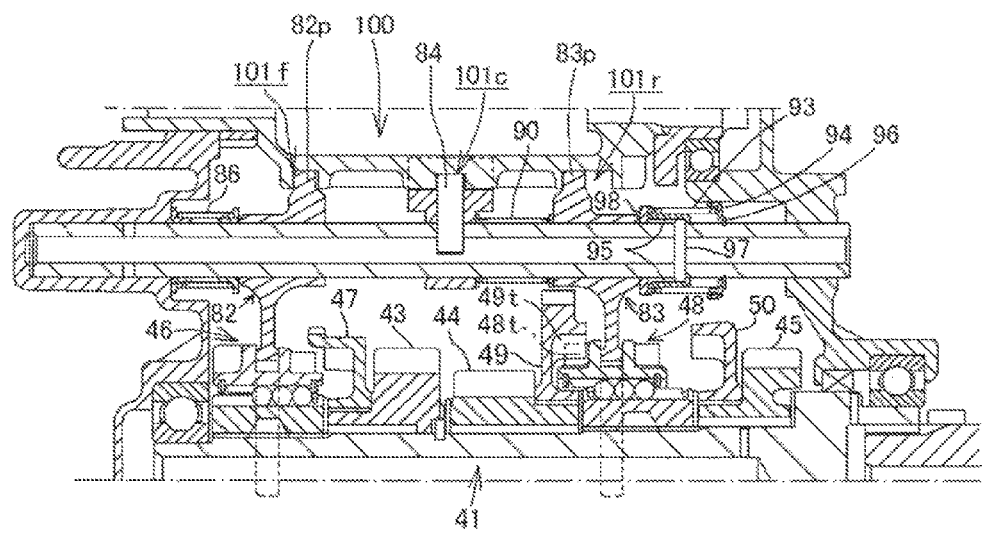
FIG. 13 is a sectional view of the main part of the subtransmission in the low-speed forward state.

Then, when the clutch teeth 48t and clutch teeth 49t come off from each other after relative rotation of the low-speed and reverse switch shifter member 48 and low-speed transmission clutch receiving member 49, as shown in FIG. 13, the low-speed and reverse switch shift fork 83 and low-speed and reverse switch shifter member 48 move frontward by the spring load of the lost motion coil spring 93, and the clutch teeth 48t and clutch teeth 49t mesh with each other. Thus, rotation of the transmission driving shaft 41 is transmitted to the low-speed transmission clutch receiving member 49 and low-speed driving gear 44 through the low-speed and reverse switch shifter member 48, whereby the low-speed driven gear 54 meshed with the low-speed driving gear 44 rotates to achieve the low-speed forward state.

As has been described, the lost motion mechanism configured of the lost motion coil spring 93 enables the dog clutch configured of the low-speed and reverse switch shifter member 48 and low-speed transmission clutch receiving member 49 to mesh flawlessly. Hence, the subtransmission Ts can be shifted smoothly from the high-speed forward state to the low-speed forward state.

In the lost motion mechanism configured of the lost motion coil spring 93, the spring load of the lost motion coil spring 93 acts on the low-speed and reverse switch shift fork 83 through the front spring bearing member 95, only when the shift fork shaft 81 moves, with rotation of the shift drum 100, in the axial direction while being guided by the shaft guide groove 101c, and this movement of the shift fork shaft 81 presses the rear spring bearing member 94 frontward through the circlip 96. Hence, it is possible to prevent the engaging pin portion 83p of the low-speed and reverse switch shift fork 83 from being constantly pressed against one wall surface of the fork guide groove 101r due to the spring load of the lost motion coil spring 93 constantly acting on the low-speed and reverse switch shift fork 83. As a result, rotational friction on the shift drum 100 can be made as small as possible, to thereby reduce the operation load at the time of shifting and achieve a smoother shifting operation.

The lost motion coil spring 93 on the shift fork shaft 81 is compressed and interposed between the rear spring bearing member 94 and front spring bearing member 95 which are restricted from moving in axial directions of departing from each other. Hence, when the shift fork shaft 81 does not move in the axial direction, the spring load of the lost motion coil spring 93 is allowed to not act on the low-speed and reverse switch shift fork 83 at all, whereas when the shift fork shaft 81 moves in the axial direction, a required spring load of the compressed lost motion coil spring 93 is allowed to immediately act on the low-speed and reverse switch shift fork 83. Thus, a smoother and more accurate shifting can be achieved.

In addition, the structure where the lost motion coil spring 93 on the shift fork shaft 81 is compressed and interposed between the rear spring bearing member 94 and front spring bearing member 95 which are restricted from moving in axial directions of departing from each other, enables the lost motion mechanism to be sub-assembled onto the shift fork shaft 81.

Specifically, the front spring bearing member 95 is formed into a cylindrical shape whose inner diameter is substantially the same as the length of the stopper pin 97, and is freely fitted to the shift fork shaft 81 to cover the stopper pin 97 fixed by penetrating the shift fork shaft 81 so as to be orthogonal thereto. The reduced diameter portion 95r of one end opening of the cylinder of the front spring bearing member 95 is locked to the stopper pin 97, and the enlarged diameter portion 95f of the other end opening bears the lost motion coil spring 93. Accordingly, the lost motion mechanism is configured compactly as a double cylinder structure in which the cylindrical front spring bearing member 95 covers a part of the outer periphery of the shift fork shaft 81, and the lost motion coil spring 93 covers the outer periphery of the front spring bearing member 95, and thus the drum type-variable speed drive 80 can be downsized.

Moreover, the lost motion mechanism configured of the lost motion coil spring 93 can be easily sub-assembled onto the shift fork shaft 81, so that the drum type-variable speed drive 80 can be easily assembled.

Figure 14:
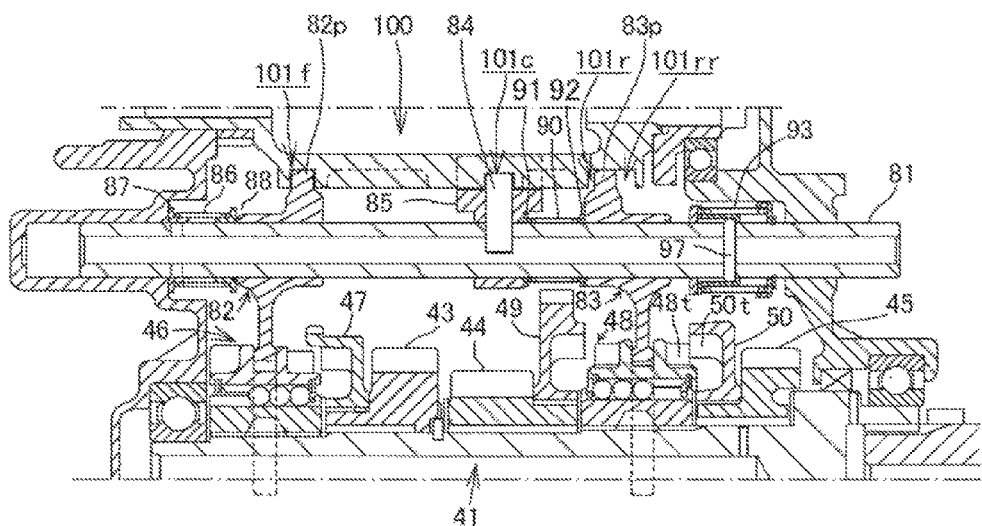
FIG. 14 is a sectional view of the main part of the subtransmission in the course of shifting from the neutral state to a reverse state; and, FIG. 15 is a sectional view of the main part of the subtransmission in the reverse state.

Next, shifting operations of the subtransmission Ts when the shift operation lever 120 is operated to a reverse position from the neutral state will be described with reference to FIGS. 14 and 15.

When the shift operation lever 120 is operated to the reverse position, the shift drum 100 rotates such that the high-speed switch shift fork 82, shift fork shaft 81, and low-speed and reverse switch shift fork 83 are guided to axial positions on the guide grooves 101f, 101c, 101r indicating the reverse position R in the outer peripheral surface-development of the drum main body 101 of FIG. 9.

The high-speed switch shift fork 82 is maintained in the base position and does not move.

Since the shift fork shaft 81 as well as the shaft pin 84 and pin holder 85 move rearward while being guided by the rearwardly-shifted groove portion 101cr where the shaft guide groove 101c is shifted rearward, the pin holder 85 compresses the lost motion coil spring 90 by pressing it rearward through the front spring bearing member 91, and the spring load of the lost motion coil spring 90 acts on the low-speed and reverse switch shift fork 83 through the rear spring bearing member 92.

The engaging pin portion 83p of the low-speed and reverse switch shift fork 83 faces the rear play space 101rr where the groove width of the fork guide groove 101r expands rearward (see FIG. 9), and the low-speed and reverse switch shift fork 83 biased rearward by the lost motion coil spring 90 is capable of moving rearward together with the low-speed and reverse switch shifter member 48 engaged therewith.

When the low-speed and reverse switch shifter member 48 moves rearward, its rear clutch teeth 48t may mesh with the clutch teeth 50t of the reverse clutch receiving member 50 if the timing is right. However, if the clutch teeth 48t abut on the clutch teeth 50t instead of meshing therewith, as shown in FIG. 14, the low-speed and reverse switch shift fork 83 and low-speed and reverse switch shifter member 48 stop after moving slightly rearward without fully entering the rear play space 101rr, and wait for the clutch to mesh by relative rotation of the low-speed and reverse switch shifter member 48 and reverse clutch receiving member 50, while receiving the spring load of the lost motion coil spring 90.

Note that when the shift fork shaft 81 thus moves rearward, the lost motion coil spring 93 and washer 98 interposed between the front spring bearing member 95 and rear spring bearing member 94 also move rearward as they are, together with the shift fork shaft 81.

Figure 15:
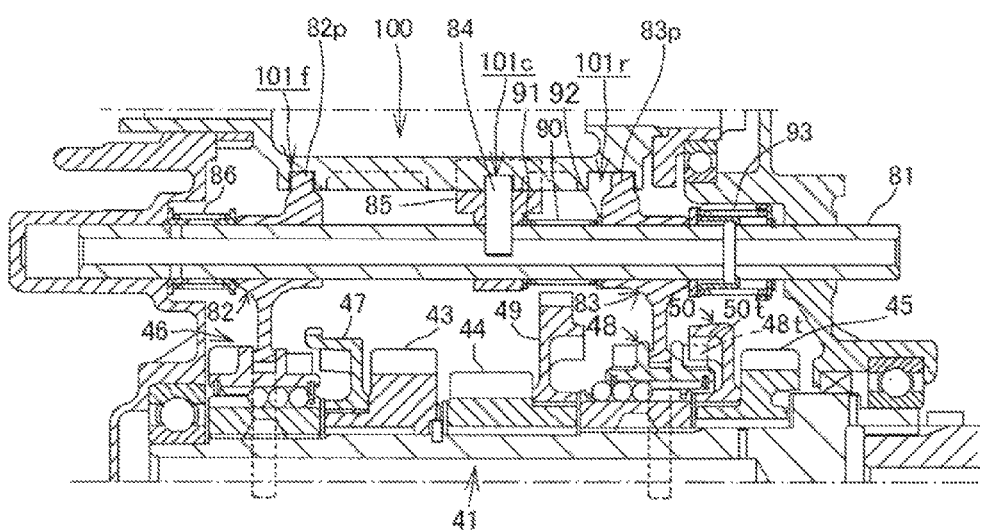

Then, when the clutch teeth 48t and clutch teeth 50t come off from each other after relative rotation of the low-speed and reverse switch shifter member 48 and reverse clutch receiving member 50, as shown in FIG. 15, the low-speed and reverse switch shift fork 83 and low-speed and reverse switch shifter member 48 move rearward by the spring load of the lost motion coil spring 90, and the clutch teeth 48t and clutch teeth 50t mesh with each other. Thus, rotation of the transmission driving shaft 41 is transmitted to the reverse clutch receiving member 50 and reverse driving gear 45 through the low-speed and reverse switch shifter member 48.

Since the reverse driving gear 45 meshes with the large-diameter middle gear 72 on the middle gear shaft 71 (see FIG. 6), rotation of the reverse driving gear 45 is transmitted to the middle gear shaft 71, and then rotation of the middle gear shaft 71 is transmitted to the transmission driven shaft (output shaft) 51 through meshing of the small-diameter middle gear 73 and low-speed driven gear 54.

Hence, rotation of the transmission driving shaft 41 rotates the transmission driven shaft (output shaft) 51 backward through the middle gear shaft 71, to achieve the reverse state.

As has been described, the lost motion mechanism configured of the lost motion coil spring 90 enables the dog clutch configured of the low-speed and reverse switch shifter member 48 and reverse clutch receiving member 50 to mesh flawlessly. Hence, the subtransmission Ts can be shifted smoothly from the neutral state to the reverse state.

In the lost motion mechanism configured of the lost motion coil spring 90, with rotation of the shift drum 100, the shift fork shaft 81 moves in the axial direction while being guided by the shaft guide groove 101c, and this movement of the shift fork shaft 81 presses the front spring bearing member 91 frontward through the pin holder 85 integrally fixed to the shift fork shaft 81 to compress the lost motion coil spring 93. Consequently, the spring load is generated and acts on the low-speed and reverse switch shift fork 83 through the rear spring bearing member 92. Hence, it is possible to prevent the engaging pin portion 83p of the low-speed and reverse switch shift fork 83 from being constantly pressed against one wall surface of the fork guide groove 101r due to the spring load of the lost motion coil spring 90 constantly acting on the low-speed and reverse switch shift fork 83. As a result, rotational friction on the shift drum 100 can be made as small as possible, to thereby reduce the operation load at the time of shifting and achieve a smoother shifting operation.

The lost motion mechanism of the invention configured of the lost motion coil spring 90 uses the shaft pin 84 (pin holder 85) fixed to the shift fork shaft 81 as the locking member for restricting the front spring bearing member 91 from moving in the axial direction of departing from the low-speed and reverse switch shift fork 83. Hence, an additional locking member does not need to be provided on the shift fork shaft 81, whereby the number of parts can be reduced and the assembly work can be simplified.

The drum type-variable speed drive 80 of the invention includes: the lost motion mechanism configured of the lost motion coil spring 93 provided opposite to the shaft pin 84 with respect to the low-speed and reverse switch shift fork 83 on the shift fork shaft 81; and the lost motion mechanism in which the lost motion coil spring 90 is interposed between the shaft pin 84 (pin holder 85) and low-speed and reverse switch shift fork 83. Accordingly, when the shift fork shaft 81 is moved to positions on both sides in the axial direction from the neutral position, the lost motion coil spring 93 or lost motion coil spring 90 can perform the lost motion function on each side while reducing the operation load at the time of shifting. Thus, the three shift positions including the neutral position can be configured easily and compactly with few parts.

Moreover, in the drum type-variable speed drive 80 of the invention, the high-speed switch shift fork 82 is provided opposite to the low-speed and reverse switch shift fork 83 with respect to the shaft pin 84 on the shift fork shaft 81, and the lost motion coil spring 86 is arranged opposite to the shaft pin 84 with respect to the high-speed switch shift fork 82. Thus supporting two shift forks 82, 83 on one shift fork shaft 81 allows multiple shift positions to be formed while keeping the assembly work easy, and allows the drum type-variable speed drive to be compactly downsized with fewer parts.

The drum type-variable speed drive 80 of the invention is provided in the subtransmission Ts of the power transmission device 20, which is configured such that the main transmission Tm constantly used during travel, and the subtransmission Ts for switching the output of the main transmission Tm to carry out the final output are combined with the internal combustion engine E. Accordingly, gears of the subtransmission Ts in the final reduction stage having small peripheral speed differences can be shifted swiftly, so that operation can be made easier and ride comfort can be improved.

DESCRIPTION OF REFERENCE NUMBERS AND LETTERS

P . . . power unit, E . . . internal combustion engine, Tm . . . main transmission, Ts . . . subtransmission, 1 . . . rough terrain vehicle, 20 . . . power transmission device, 21 . . . crankshaft, 31 . . . main shaft, 32 . . . countershaft, 40*f* . . . front subtransmission case, 40*r* . . . rear subtransmission case, 41 . . . transmission driving shaft, 43 . . . high-speed driving gear, 44 . . . low-speed driving gear, 45 . . . reverse driving gear, 46 . . . high-speed switch shifter member, 47 . . . high-speed transmission clutch receiving member, 48 . . . low-speed and reverse switch shifter member, 49 . . . low-speed transmission clutch receiving member, 49*p* . . . locking groove for parking, 50 . . . reverse clutch receiving member, 51 . . . transmission driven shaft (output shaft), 53 . . . high-speed driven gear, 54 . . . low-speed driven gear, 71 . . . middle gear shaft, 72 . . . large-diameter middle gear, 73 . . . small-diameter middle gear, 80 . . . drum type-variable speed drive, 81 . . . shift fork shaft, 82 . . . high-speed switch shift fork, 83 . . . low-speed and reverse switch shift fork, 84 . . . shaft pin, 85 . . . pin holder, 86 . . . lost motion coil spring, 87, 88 . . . spring bearing member, 90 . . . lost motion coil spring, 91, 92 . . . spring bearing member, 93 . . . lost motion coil spring, 94, 95 . . . spring bearing member, 96 . . . circlip, 97 . . . stopper pin, 98 . . . washer, 100 . . . shift drum, 101 . . . drum main body, 101*f*, 101*r* . . . fork guide groove, 101*c* . . . shaft guide groove, 111 . . . shift spindle, 120 . . . shift operation lever, 121 . . . shift cable.

What is claimed is:

1. A drum type-variable speed drive in which an engaging pin portion of a shift fork pivotally supported by a shift fork shaft in a slidable manner slidably engages with a fork guide groove on the outer peripheral surface of a shift drum, and with rotation of said shift drum, said shift fork moves in an axial direction while being guided by said fork guide groove, to thereby move a shifter member of a transmission engaged with said shift fork and drive the gear shift, wherein:

said shift fork shaft is supported by an engine case so as to be moveable in the axial direction;

a shaft pin is provided on said shift fork shaft so as to protrude toward said shift drum;

a shaft guide groove with which said shaft pin slidably engages is formed on said shift drum;

a spring bearing member, which is restricted from moving in the axial direction of departing from said shift fork by a locking member fixed to said shift fork shaft, is pivotally supported by said shift fork shaft;

a lost motion spring is interposed between said spring bearing member and said shift fork; and movement of said shift fork shaft in the axial direction caused by rotation of said shift drum presses said spring bearing member through said locking member, whereby the spring load of said lost motion spring acts on said shift fork.

2. A drum type-variable speed drive in which the engaging pin portion of the shift fork pivotally supported by the shift fork shaft in a slidable manner slidably engages with the fork guide groove on the outer peripheral surface of the shift drum, and with rotation of said shift drum, said shift fork moves in an axial direction while being guided by said fork guide groove, to thereby move the shifter member of the transmission engaged with said shift fork and drive the gear shift, wherein:

said shift fork shaft is supported by the engine case so as to be moveable in the axial direction;

the shaft pin is provided on said shift fork shaft so as to protrude toward said shift drum;

the shaft guide groove with which said shaft pin slidably engages is formed on said shift drum;

a spring bearing member on one side, which is restricted from moving in the axial direction of departing from said shift fork by a locking member on one side fixed to said shift fork shaft, is pivotally supported by said shift fork shaft;

a spring bearing member on the other side, which is restricted from moving in the axial direction of approaching said shift fork by a locking member on the other side fixed to said shift fork shaft between said shift fork and said locking member on one side, is pivotally supported by said shift fork shaft;

a lost motion spring is compressed and interposed between said spring bearing member on one side and said spring bearing member on the other side; and movement of said shift fork shaft in the axial direction caused by rotation of said shift drum presses said spring bearing member on one side through said locking member on one side, whereby the spring load of said lost motion spring acts on said shift fork through said spring bearing member on the other side.

3. The drum type-variable speed drive according to claim 2, wherein:

said locking member on the other side is a stopper pin fixed by penetrating said shift fork shaft so as to be orthogonal thereto with both ends slightly protruding therefrom;

said spring bearing member on the other side is formed into a cylindrical shape whose inner diameter is substantially the same as the length of said stopper pin, and is freely fitted to said shift fork shaft to cover said stopper pin;

said lost motion spring is a lost motion coil spring covering the cylinder outer periphery of said spring bearing member on the other side; and a reduced diameter portion of one end opening of the cylinder of said spring bearing member on the other side is locked to said stopper pin, while an enlarged diameter portion of the other end opening bears said lost motion coil spring.

4. The drum type-variable speed drive according to claim 3, wherein:
- said lost motion spring is provided opposite to said shaft pin with respect to said shift fork on said shift fork shaft; and
- a second lost motion spring is interposed between said shaft pin and said shift fork.

5. The drum type-variable speed drive according to claim 1, wherein:
- a second shift fork is provided opposite to said shift fork with respect to said shaft pin on said shift fork shaft; and
- a lost motion spring is arranged opposite to said shaft pin with respect to said second shift fork.

6. The drum type-variable speed drive according to claim 1, wherein:
- said drum type-variable speed drive is provided in a subtransmission of a power transmission device, which is configured such that a main transmission constantly used during travel, and said subtransmission for switching the output of the main transmission to carry out the final output are combined with an internal combustion engine.

7. The drum type-variable speed drive according to claim 2, wherein:
- a second shift fork is provided opposite to said shift fork with respect to said shaft pin on said shift fork shaft; and
- a lost motion spring is arranged opposite to said shaft pin with respect to said second shift fork.

8. The drum type-variable speed drive according to claim 2, wherein:
- said drum type-variable speed drive is provided in a subtransmission of a power transmission device, which is configured such that a main transmission constantly used during travel, and said subtransmission for switching the output of the main transmission to carry out the final output are combined with an internal combustion engine.

9. The drum type-variable speed drive according to claim 3, wherein:
- said drum type-variable speed drive is provided in a subtransmission of a power transmission device, which is configured such that a main transmission constantly used during travel, and said subtransmission for switching the output of the main transmission to carry out the final output are combined with an internal combustion engine.

10. The drum type-variable speed drive according to claim 4, wherein:
- said drum type-variable speed drive is provided in a subtransmission of a power transmission device, which is configured such that a main transmission constantly used during travel, and said subtransmission for switching the output of the main transmission to carry out the final output are combined with an internal combustion engine.

11. The drum type-variable speed drive according to claim 5, wherein:
- said drum type-variable speed drive is provided in a subtransmission of a power transmission device, which is configured such that a main transmission constantly used during travel, and said subtransmission for switching the output of the main transmission to carry out the final output are combined with an internal combustion engine.

12. The drum type-variable speed drive according to claim 7, wherein:
- said drum type-variable speed drive is provided in a subtransmission of a power transmission device, which is configured such that a main transmission constantly used during travel, and said subtransmission for switching the output of the main transmission to carry out the final output are combined with an internal combustion engine.

* * * * *